United States Patent
Zang et al.

(10) Patent No.: US 8,655,314 B1
(45) Date of Patent: Feb. 18, 2014

(54) TELECOM-FRAUD DETECTION USING DEVICE-LOCATION INFORMATION

(75) Inventors: Hui Zang, Cupertino, CA (US); Travis E. Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 330 days.

(21) Appl. No.: 12/839,893

(22) Filed: Jul. 20, 2010

(51) Int. Cl.
  *H04M 1/66* (2006.01)

(52) U.S. Cl.
  USPC ............... 455/411; 455/414.1; 455/414.2; 455/456.1; 702/189

(58) Field of Classification Search
  USPC .......... 455/411, 414.1, 414.2, 456.2; 702/189
  See application file for complete search history.

(56) References Cited

U.S. PATENT DOCUMENTS

2008/0101571 A1* 5/2008 Harlow et al. ............... 379/189
2008/0162086 A1* 7/2008 Hsyu et al. ................... 702/189

FOREIGN PATENT DOCUMENTS

EP 0981068 1/1999

OTHER PUBLICATIONS

Fawcett, Tom et al. "Adaptive Fraud Detection", 1997. Kluwer Academic Publisher, pp. 1-14.*
Burge, Peter, et al., Detecting Cellular Fraud Using Adaptive Prototypes., Department of Computer Science, Royal Holloway University of London, England., 1997.
Burge, Peter, et al., Fraud Detection and Management in Mobile Telecommunications Networks., Royal Holloway University of London, England.
Fawcett, Tom, et al., Adaptive Fraud Detection, NYNEX Science and Technology, White Plains, NY., 1997.
Fawcett, Tom, et al., Activity Monitoring: Noticing interesting changed in behavior., Bell Atlantic Science and Technology, White Plains, NY., 1999.
Moreau, Yves, et al., A hybrid system for fraud detection in mobile communications., 1999.
Britos, Paola, et al., Unusual Changes of Consumption Detection in Mobile Phone Users, Software & Knowledge Engineering Center Graduate School, Buenos Aires Institute of Technology, 2006.
Gopal, Rupesh, K., et al., A Rule-based Approach for Anomaly Detection in Subscriber Usage Pattern, 2007.

* cited by examiner

*Primary Examiner* — Wayne Cai
*Assistant Examiner* — Chuck Huynh

(57) ABSTRACT

Subject matter described herein is directed to detecting unauthorized use, such as by a cloned mobile device, of wireless telecommunication services. Differences in location patterns of unauthorized and authorized mobile devices are leveraged to detect likely fraudulent uses. For example, a location-pattern entropy of an authorized mobile device is tracked. A change in the location-pattern entropy suggests an unauthorized use of the mobile device's account.

9 Claims, 3 Drawing Sheets

TELECOM-FRAUD DETECTION USING DEVICE-LOCATION INFORMATION

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

At a high level, ways of detecting fraud in a telecommunications environment are provided. Differences in location patterns of unauthorized and authorized mobile devices are leveraged to detect likely fraudulent uses. For example, a location pattern of an authorized mobile device is tracked. A change in the location pattern suggests an unauthorized use of the mobile device's account.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
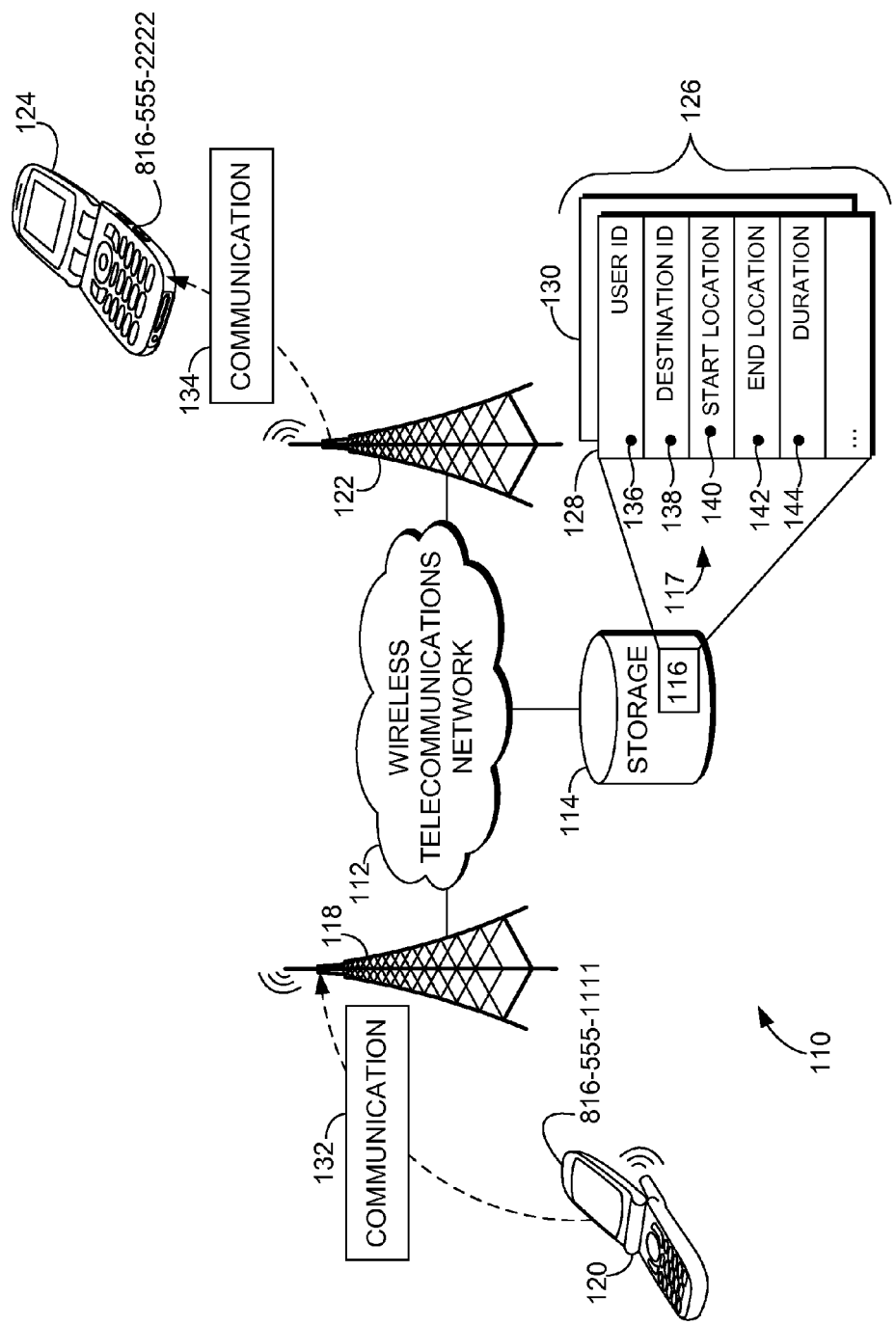
FIG. 1 depicts an exemplary operating environment in accordance with an embodiment of the present invention.

Referring now to FIG. 1, an exemplary operating environment suitable for practicing an embodiment of the technology is depicted and identified generally by reference numeral 110. Operating environment 110 includes a wireless telecommunications network 112. Wireless telecommunications network 112 is capable of communicating various technologies, such as CDMA, GPRS, GSM, and WiMAX.

Various components depicted in operating environment 110 communicate by way of wireless telecommunications network 112. One such component includes a first base transceiver station or tower 118. Base station 118 is capable of wirelessly communicating with a first mobile device 120. Similarly, a second base transceiver station or tower 122, which communicates with base station 118 by way of wireless communication network 112, can communicate with a second mobile device 124. Moreover, mobile devices 120 and 124 can communicate with one another using towers 118 and 122 and wireless communication network 112. For example, mobile device 120 might send a communication 132, such that mobile device 124 receives a communication 134. Communication 132 might be sent in a variety of contexts. For example, mobile device 120 might initiate a voice call, send an instant message or a text message, send an email, or send a voicemail. Although FIG. 1 depicts a communication being exchanged between two mobile devices, a communication might also include a request by mobile device 120 to received data (e.g., web content), the delivery of which is facilitated by network 112.

In one embodiment, wireless telecommunications network 112 is coupled to storage 114. Storage 114 includes information 116, which is depicted in an exploded view 117 for illustrative purposes. Exploded view 117 includes a set of communication records 126. Set 126 includes individual communication records 128 and 130 that include communication attributes (e.g., user id, destination id, start location, end location, duration, etc). Each record of communication information corresponds to a respective communication, such as communication 132. A respective communication corresponding to each record 128 and 130 might include various types of communication. For example, as previously indicated, a communication might include a voice call, instant message or a text message, an email, a voicemail, or a combination thereof. Sometimes, communication information is referred to as Call Data Records (CDR).

For illustrative purposes, communication record 128 corresponds to communication 132 and 134. That is, record 128 is generated in response to communications 132 and 134 and includes various communication attributes that describe communications 132 and 134. In one embodiment of the present invention, communication record 128 includes a user identifier 136, which identifies a user, a mobile device, an account, or a combination thereof. That is, since device 120 engaged in communication 132 and record 128 is created to describe communication 132, user identifier 136 identifies device 120, a user of device 120, or an account that device 120 is authorized to use to access network 112. User identifier 136 might also identify an account, which authorizes device 120 to utilize services of wireless telecommunications network 112. Moreover, communication record 128 includes other fields that are associated with and that describe communication 132. For example, other fields include a destination identifier 138 corresponding to another endpoint of communication 132 (i.e., the destination of an outgoing call or the origination of an incoming call); a start location 140 representing a location of mobile device 120 when communication 132 was initiated; an end location 142 representing a location of mobile device 120 when communication 132 was terminated or completed; and a duration 144 of communication 132. An exemplary start location or end location might include a BTS identifier, a cell, a sector, a city, a zip code, a state, a geographical coordinate, or a combination thereof. These fields are exemplary and other embodiments might include more, fewer, or different fields in each communication record.

Figure 2:
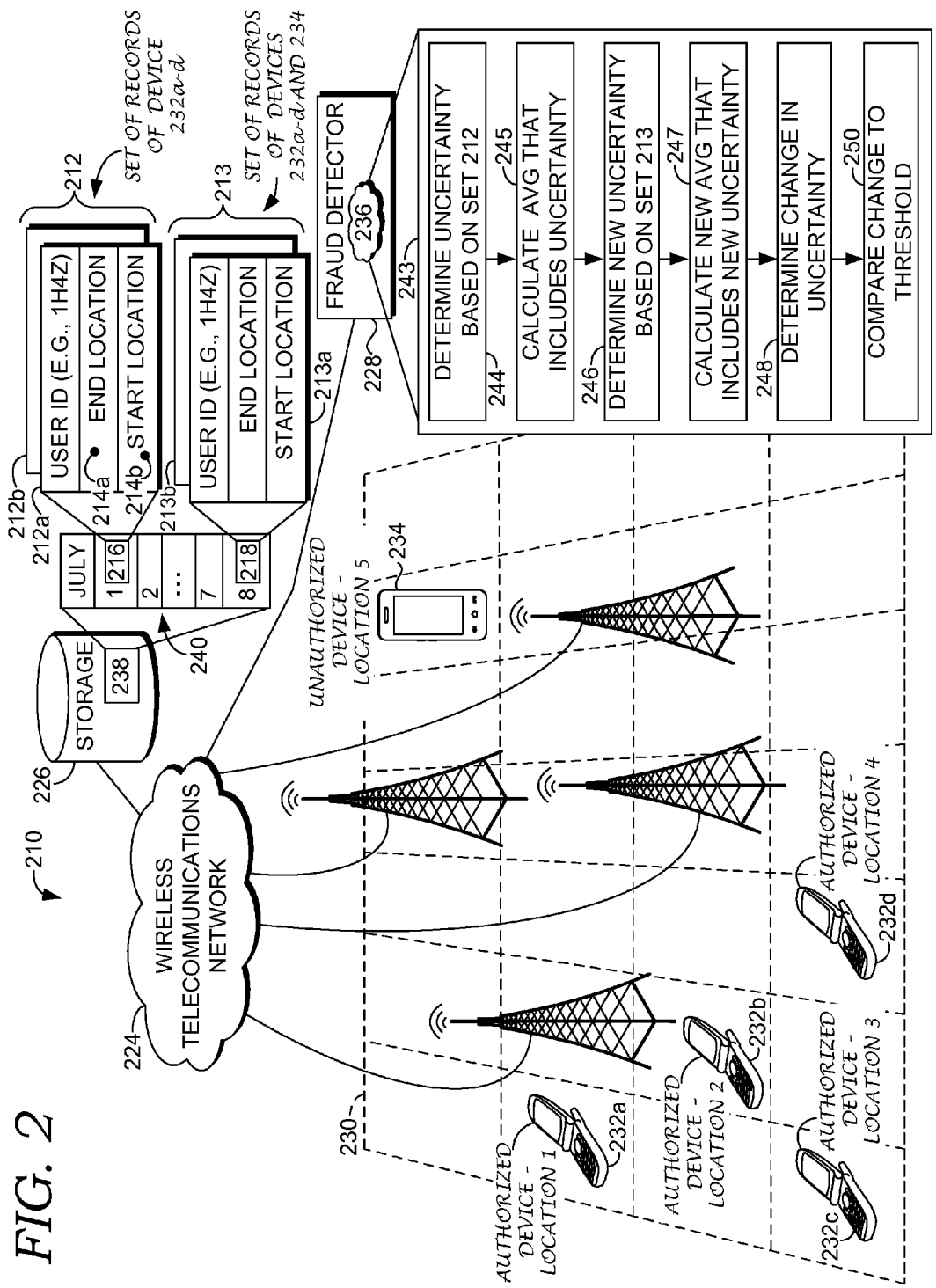
FIG. 2 depicts an exemplary operating environment in accordance with an embodiment of the present invention.

Referring now to FIG. 2, subject matter is described that leverages communication records and the attributes included therein, such as set 126 and individual records 128 and 130 that were described with respect to FIG. 1. Communication records and attributes are also depicted in FIG. 2 and are identified generally as set 212, which includes records 212a and 212b, and set 213, which includes records 213a and 213b. While for illustrative purposes only two records are depicted in each of sets 212 and 213, each set might include several additional records. Also, while for illustrative purposes each record only depicts user-id information and location information, each record might also include several other categories of information, such as those described with respect to FIG. 1.

FIG. 2 includes various elements that communicate with one another, such as wireless telecommunications network 224, storage 226, fraud detector 228, and mobile devices. FIG. 2 depicts two different mobile devices that are identified as "authorized device" and "unauthorized device" and that are positioned on a grid 230. Although not numbered, grid 230 depicts that the authorized device and unauthorized device are located at different geographical locations (i.e., different coordinates). Authorized device is depicted in four different locations and is identified by reference numerals 232a, 232b, 232c, and 232d. When referring to authorized device in general, the identifier 232a-d is referenced. Unauthorized device is identified by reference numeral 234. As will be described in more detail hereinafter, an unauthorized device includes a device that utilizes services of wireless telecommunications network 224 in a manner that attributes the use to an account of a different mobile device.

Wireless telecommunications network 224 might facilitate communication of mobile devices in a manner similar to that described with respect to FIG. 1. In one embodiment, when mobile device 232a-d or 234 engages in a communication, a communication record is created by a component of wireless telecommunications network 224 and maintained in storage 226. Each depiction of mobile device 232a-d includes a respective location at which mobile device 232a-d engages in a communication. For example, mobile device 232a includes a first location at which mobile device 232a-d engages in a communication, which generates communication record 212a having location information 214a and 214b. Likewise, mobile device 232b, 232c, and 232d each include a respective location at which mobile device 232a-d engages in a different communication and each of the different communications generates respective communication records, such as the additional records in set 212 or 213. Each of records 212b, 213a, and 213b includes location information that describes a respective location. Moreover, unauthorized mobile device 234 includes a respective location (i.e., location 5) at which mobile device 234 engages in a communication, which generates a communication record that is stored among set 213 and that includes location information.

Typically, in order for mobile device 232a-d to utilize services provided by wireless telecommunications network 224, mobile device 232a-d establishes an account with a network provider (not shown). Such an account allows terms-of-service to be established and allows the network provider to track use of network services by mobile device 232a-d. Generally, an account identifies one or more mobile devices that are authorized to use services, i.e., when an authorized device uses services, the services are attributable or chargeable to the account. However, sometimes unauthorized device 234 will deceive network 224 to attribute use of services to an account on which unauthorized device 234 is not approved. For example, unauthorized device 234 might send information (e.g., ESN, MIN, phone number, etc.) to network 224 that identifies unauthorized device 234 as mobile device 232a-d. Such unauthorized devices are sometimes referred to as cloned mobile devices.

Storage 226 might maintain communication records in a manner that associates a communication record (e.g., 212a) with an account of a mobile device that generated the communication record. For example, storage 226 includes information 238 that is depicted in an exploded view 240 for illustrative purposes. Exploded view 240 depicts a number of days that are included in a timeframe (i.e., from July 1 to July 8). As previously indicated, mobile device 232a-d and unauthorized device 234 might engage in various communications on each day that generate different records. As such, July 1 includes information 216 that is shown in an exploded view to include set 212 and July 8 includes information 218 that is shown in an exploded view to include set 213. Likewise, each of the days from July 2-7 might also include communication records (not shown) that were generated thereon. Set 212 and 213, as well as records generated on July 2-7, might be associated with an account of mobile device 232a-d regardless of whether the records are generated by mobile device 232a-d or unauthorized mobile device 234. That is, unauthorized device 234 deceives network 224 to believe that, when unauthorized device 234 utilizes services, the use is attributable to an account of mobile device 232a-d. Again, although only four records 212a, 212b, 213a, and 213b are depicted in FIG. 2, storage 226 might include a much larger set of records that are associated with an account of mobile device 232a-d. For example, over the course of a day, week(s), or month(s), mobile device 232a-d might engage in a number of communication sessions that generate a significant number more (e.g., hundreds or thousands) of communication records, which are maintained in storage 226 and are associated with an account of mobile device 232a-d. Likewise, unauthorized device 234 might engage in a number of other communication sessions that also generate additional communication records, which are maintained in storage 226 and are associated with an account of mobile device 232a-d.

Fraud detector 228 analyzes communication attributes in sets 212 and 213 that are associated with mobile device 232a-d or with an account of mobile device 232a-d. Fraud detector might also analyze attributes collected on other days, such as June 25-30 and July 2-7. In one embodiment, fraud detector 228 utilizes communication records to quantify a measure of uncertainty of a communication pattern associated with a mobile device or mobile-device account. A measure of communication-pattern uncertainty uses previously received records to suggest a likelihood that an attribute for which uncertainty is analyzed can be correctly predicted for subsequent communication instances. For example, location is one attribute of communication records. Location information (e.g., start location 214a) might be collected for a period of time (e.g., day, week, month, etc.) and analyzed to quantify the uncertainty in the location pattern of a user carrying the cell phone device. When a mobile device engages in communication at several different locations throughout the period of time, the uncertainty of the location attribute might be higher as compared to a mobile device that engages in communication at only a few different locations. For example, if a mobile device engages in communication at only two locations (e.g., A and B), the uncertainty of a location attribute, when the mobile device engages 90% communication at A and 10% at B, is lower than the uncertainty of the location attribute when the mobile device engages 50% communication at each of the two locations A and B. That is, in the first case, an observer will likely predict that the next location of communication will take place at location A, and there will be a 90% chance that the prediction is right. Alternatively, in the latter case, there will be only a 50% chance that a prediction will be correct. In an embodiment of the invention, a high uncertainty of a communication attribute suggests that the attribute is less predictable when describing subsequent communication instances.

In an embodiment, a period of time (e.g., one day, one week, etc.) is analyzed during which mobile device 232a-d appears at m distinct locations, which are identified as $B_1, B_2, \ldots, B_m$. As such, a measure of communication-attribute uncertainty is quantified based on Shannon entropy and is calculated using Formula I, represented as:

$$H(X) = -\sum_{i=1}^{n} p(x_i) \log_2 p(x_i)$$

When analyzing a measure of communication-attribute uncertainty over a period of time, variable $x_i$ of Formula I might be defined as $k_i/T$, such that a Formula II is represented as:

$$H(A) = -\sum_{i=1}^{m} (k_i/T) \log_2 (k_i/T)$$

Pursuant to Formula II, $k_i$ is a number of times mobile device 232a-d appeared at $B_i$ during the period of time, and T is the total number of appearances of 232a-d. As such, $k_i/T$ is a fraction of appearances of mobile device 232a-d at $B_i$. In an embodiment of the present invention, a measure of entropy is calculated using Formula II over a period of time, such as a day or a week. For example, mobile device 232a-d might engage in various communication sessions over the course of a day, the various communication sessions starting or ending at a variety of locations. As such, communication records of the various communication sessions over the course of the day are collected and stored, and the entropy of the variety of locations is calculated using Formula II. Although the above example describes calculating entropy using Formula II at the end of a day. Formula II might also be used to calculate entropy over a week or any other desired time period.

In a further embodiment, a weighted moving average of a measure of communication-attribute uncertainty is determined. For example, a measure of communication-attribute uncertainty is calculated (i.e., using Formula II) each day over a defined time period (e.g., a week), and a weighted moving average is calculated for all measures (i.e., results of Formula II) calculated within that time period. That is, for each of a selected interval (i) (e.g., a day), a measure of communication-attribute uncertainty ($h_i$) (e.g., result of Formula II) is determined (based on communication records associated with an account that is received during that interval) and is used to calculate a weighted moving average over a selected time period (e.g., a week). As such, a weighted moving average might be determined by applying Formula III, which is represented as:

$$H_i = (1-\alpha)*H_{i-1} + \alpha(h_i)$$

Pursuant to Formula III, $H_i$ is the weighted moving average that takes into account a most recent measure of communication-attribute uncertainty (i.e., new sample or $h_i$) calculated for a most recent interval (e.g., day), in addition to the weighted moving average that was calculated at the end of the prior interval (e.g., at the end of the prior day (i−1)). Moreover, $\alpha$ is a constant between 0 and 1 to be customized based on how much weight is desired to be given to the historical values (i.e., $H_{i-1}$) and the new sample value (i.e., $h_i$). In an embodiment of the present invention, $\alpha$ is a fraction less than one, such that a smaller $\alpha$ value will accord less weight to the new sample value and more weight to historical values. Likewise, a larger $\alpha$ value will accord more weight to the new sample value and less weight to the historical values. The $\alpha$ constant might also be customized depending on the size of the period of time over which the weighted moving average is being calculated. For example, for a longer period of time, it might be desired to assign a a smaller value (i.e., smaller fraction), thereby giving the new sample value less weight. In an embodiment, $\alpha$ is equal to the dividend of one divided by the size of time period (e.g., 7 days) over which the weighted moving average is being calculated. For example, if the time period is 7 days, $\alpha$ might be defined to be 1/7.

In an embodiment, a measure of communication-attribute uncertainty is a reflection of a usage style of a user of mobile device 232a-d. That is, a high or low measure is a reflection of how a user moves around in his or her daily or weekly lifestyle, and a measure of communication-attribute uncertainty often remains stable over a range of time. For example, an account with a relatively low measure of communication-attribute uncertainty (or relatively low weighted moving average) is likely to remain relatively low over a range of time, and likewise, an account with a relatively high measure of communication-attribute uncertainty is likely to remain relatively high over the range. However, an increase in the uncertainty of communication attributes of an account suggests that another device might have started using services in a manner that attributes the use to the account. Accordingly, an embodiment of the invention applies differential analysis. For example, fraudulent use is detected based on a difference between two measures of uncertainty, as opposed to based on an absolute measure of uncertainty. That is, a high measure or low measure of uncertainty is not necessarily an indicator of fraudulent activity; however, a sudden or significant increase in uncertainty (i.e., increase in entropy suggesting that communication information is less predictable and harder to predict) might suggest fraudulent activity.

In a further embodiment, a measurement window is defined (T) (e.g., 7 days) and weighted moving averages of different windows are compared to detect increase in uncertainty of a communication attribute. For example, an increase in uncertainty might be evidenced by an increase in entropy. As such, an increase in entropy might be detected by satisfaction of Formula IV, which is represented as:

$$H_i - H_{i-T} > \beta * H_{i-T}$$

As previously indicated, $H_i$ is the weighted moving average on a given interval (e.g., day) that takes into account entropy calculations made during a defined window (e.g., the prior week. The variable $H_{i-T}$ includes a weighted moving average that was calculated on the interval (e.g., day) prior to starting the measurement window that defines $H_i$. For example, if $H_i$ is calculated on day 17 based on days 11-17, such that T is equal to 7, then $H_{i-T}$ is the weighted moving average on day 10. In Formula IV, $\beta$ is a defined threshold. For example, it might be determined that an increase in weighted moving averages of more than 20% suggests that an unauthorized device is using services in a manner that attributes the use to the account. The defined threshold is customizable based on a desired sensitivity. For example, if it is desired to deem activity fraudulent based on a small change in weighted moving averages, then the threshold can be defined to include a relatively low value.

In an embodiment of the present invention, fraud detector 228 includes a set of embodied computer-executable instructions that facilitates various functional aspects of embodiments of the invention. For example, fraud detector 228 includes an application 236 that is executed by fraud detector 228. That is, fraud detector 228 includes a computing device having components (e.g., processor and computer-readable media) that enable execution of application 236 and that enable fraud detector 228 to detect unauthorized use of telecommunication services that are attributable to an account. Illustrative operating environments 110 and 210, which are described above, are usable to facilitate a method of detecting unauthorized use of telecommunication services that are attributable to an account. That is, communication records associated with an account can be tracked by network 224 and analyzed by fraud detector 228 in a manner that enables network 224 (or fraud detector 228) to deem when fraudulent activity might have occurred. For example, communication records might be tracked over a course of an interval (e.g., day or week) and an entropy calculation made (e.g., using Formula II) at the end of the interval to assess attribute uncertainty. The entropy calculation can then be used to determine a weighted moving average (e.g., using Formula III) when a sufficient number of entropy calculations have been made. As described above, weighted moving averages can be compared to detect an increase in entropy, which suggests an increase in uncertainty and fraudulent activity.

Figure 3:
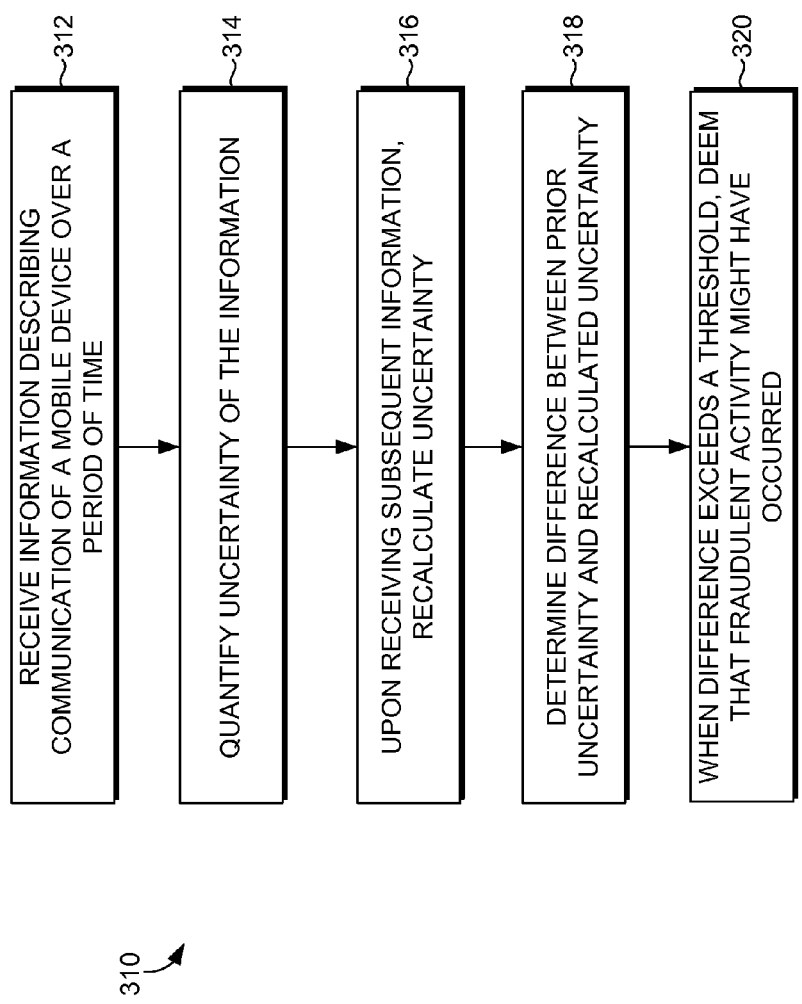
FIG. 3 depicts a flow diagram in accordance with an embodiment of the present invention.

Now referenced is FIG. 3, which depicts an exemplary method of detecting unauthorized use of telecommunication services that are attributable to an account. In describing FIG. 3, reference is also made to FIGS. 1 and 2. For example, telecommunication services might include services provided by network 224, and an account might include an account of mobile device 232a-d. FIG. 3 depicts a method that is generally identified by reference numeral 310. One embodiment of the present invention is directed to one or more computer-readable media having computer-executable instructions embodied thereon that, when executed, perform method 310.

Step 312 of method 310 includes receiving information describing communication of a mobile device over a period of time. For example, communication information (i.e., communication records) might be received that describes a communication session of a mobile device, which is authorized to use services attributable to the account. The communication information includes multiple attributes of the communication, such as location information. As previously described, fraud detector 228 might receive from storage 226 communication records that are created when mobile device 232a-d engages in a communication session. A communication session might include a voice call, a text message, an email, or any other type of communication transmitted via network 224. Also previously described is that mobile device 232a-d is authorized to use services of network 224, such as by using an account associated with mobile device 232a-d. In an embodiment, communication records includes location information (e.g., 214a or 214b), which might include a cell, a sector, a city, a zip code, a state, a geographical coordinate, or a combination thereof. Furthermore, communication records (e.g., set 212) might be received over a defined period of time, such as a day (e.g., July 1) or a week (e.g., July 1-7). As previously indicated, set 212, as well as records collected during June 25-June 30 and July 2-7, might include a larger quantity of communication information that is collected over the course of a defined time period (e.g., a day or a week), and fraud detector 228 might receive this larger quantity.

Step 314 includes quantifying an uncertainty of a communication attribute included among the received information (i.e., the information received in step 312). As previously described, entropy might be one value that quantifies uncertainty, such that a higher entropy suggests higher uncertainty and a lower entropy suggests a lower uncertainty. Fraud detector 228 might use the communication information (e.g., location information of set 212 and/or 213) to quantify a measure of uncertainty in various ways. As previously described, fraud detector 228 might calculate a measure of Shannon entropy using Formula II, such as by using records collected on July 1. Moreover, fraud detector 228 might use Formula III to calculate a weighted moving average based on the communication information that is received over the defined period of time (e.g., records collected from June 25-July 1 or from July 2-8). As previously described, using either Formula II or Formula III suggests a variability of communication information. That is, a result of Formula II or Formula III suggests a likelihood that an attribute for which uncertainty is analyzed can be correctly predicted for subsequent communication instances.

For illustrative purposes, application 236 is depicted in an exploded view, which depicts a method that is generally identified by reference numeral 243. Method 243 includes steps 244 and 245, which exemplify step 314 of FIG. 3. Step 244 indicates that fraud detector 228 determines uncertainty (i.e., a measure of communication-information uncertainty) based on communication records of set 212. For example, fraud detector 228 might use location information (e.g., 214a or 214b) included in the records of set 212 to calculate Shannon entropy using Formula II. Moreover, step 245 indicates that fraud detector 228 calculates an average using the uncertainty calculated in step 244. For example, fraud detector might calculate a weighted running average by applying Formula III to Shannon entropy values calculated using communication information (e.g., location information) collected from June 25-July 1.

Step 316 includes, upon receiving subsequent information (e.g., subsequent communication records or attributes) recalculating the uncertainty. That is, the measure of communication-information uncertainty is recalculated. To further illustrate step 316 of FIG. 3, method 243 of FIG. 2 depicts steps 246 and 247. That is, step 246 includes determining a new uncertainty based on set 213. For example, fraud detector 228 might calculate a value of Shannon entropy by applying Formula II to information 218 collected on July 8. Moreover, step 247 indicates that fraud detector 228 calculates a new average, which includes communication information (e.g., location information) collected from July 2-8. For example, fraud detector 228 might apply Formula III to Shannon entropy values calculated from location information received from July 2-8.

Step 318 includes determining a difference between the prior uncertainty and the recalculated uncertainty, such as by subtracting the result of step 314 from the result of step 316. Referring to FIG. 2, step 248 indicates that the change in uncertainty is determined, such as by subtracting the result of step 245 from the result of step 247. Step 320 includes, when the difference between the prior prediction and the recalculated prediction exceeds a threshold, deeming fraudulent activity might have occurred. For example, by applying Formula IV, where $\beta$ is defined to include a threshold, fraud detector 228 can determine when fraudulent activity might have occurred. Referring to FIG. 2, in step 250, fraud detector 228 compares the difference calculated in step 248 to a threshold (e.g., 20%). A sufficiently large difference (i.e., increase in measure of uncertainty that exceeds a threshold) suggests that different or additional mobile device (e.g., unauthorized mobile device 234) has started using services of the network that are being attributed to an account (e.g., account of mobile device 232a-d). Such differential analysis can be used to detect when a use of network 224 (e.g., use by unauthorized device 234) should not be attributed to an account of mobile device 232a-d.

In an embodiment of the present invention, detecting when a use might be unauthorized is usable to trigger various desired actions. For example, an account might be flagged to indicate a possible unauthorized use. In addition, services of an account might be frozen or terminated altogether. Further, an alarm (e.g., visual indicator) might be triggered that notifies an alarm recipient of the possible unauthorized use.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method of detecting unauthorized use of telecommunication services that is attributable to an account, the method comprising:
  receiving location information that describes a location of a mobile device, which is authorized to use services attributable to the account;
  using the location information to quantify a measure of location uncertainty, which suggests a variability of the location information that was received,
    wherein the measure of location uncertainty is calculated based on a measure of Shannon entropy defined by $$H(A) = -\sum_{i=1}^{m}(k_i/T)\log_2(k_i/T);$$

and
    wherein $k_i$ is equal to a number of times the mobile device appeared at a particular location, and T is equal to a total number of appearances of the mobile device;
  upon receiving subsequent location information, applying differential analysis to assess an effect of the subsequent location information on the measure of Shannon entropy; and
  when the effect includes a change that exceeds a threshold, deeming that the subsequent location information describes another communication session of a different mobile device.

2. The one or more computer-readable media of claim 1, wherein the location information includes a starting location in which a communication session is initiated, an ending location in which the communication session is terminated, or a combination thereof.

3. The one or more computer-readable media of claim 1, wherein the location information includes a cell, a sector, a city, a zip code, a state, a geographical coordinate, or a combination thereof.

4. The one or more computer-readable media of claim 1, wherein the measure of location uncertainty includes a measure of Shannon entropy.

5. The one or more computer-readable media of claim 1, wherein the differential analysis calculates a difference between a first weighted moving average of location information, which is received prior to receipt of the subsequent location information, and a second weighted moving average that includes the subsequent location information.

6. One or more non-transitory computer-readable media having computer-executable instructions embodied thereon that, when executed, perform a method of detecting unauthorized use of telecommunication services that is attributable to an account, the method comprising:
  receiving a set of communication records that describes communication sessions of a mobile device, which is authorized to use services attributable to the account;
  using the set of communication records to quantify a first weighted moving average of Shannon entropy, which suggests a variability of an attribute included in the communication records,
    wherein Shannon entropy is calculated using a formula that is represented by:

$$H(A) = -\sum_{i=1}^{m}(k_i/T)\log_2(k_i/T),$$

in which $k_i$ is equal to a number of times the mobile device appeared at a particular location T is equal to a total number of appearances of the mobile device, and
    wherein the weighted moving average is calculated using a formula represented by:

$$H_i = (1-\alpha)H_{i-1} + \alpha h_i,$$

in which $\alpha$ is a constant, $H_{i-1}$ is equal to a weighted average Shannon entropy of location information for a duration of time prior to receipt of the subsequent communication information, $h_i$ is equal to a Shannon entropy calculated using the subsequent communication information;
  receiving subsequent communication records, which are used to quantify a second weighted moving average of Shannon entropy;
  subtracting the first moving average from the second moving average to calculate a difference between the first moving average and the second moving average; and
  when the difference satisfies a threshold, deeming that the subsequent communication records describe a subsequent communication session of a different mobile device.

7. The one or more computer-readable media of claim 6, wherein the communication records include location information, which includes a starting location in which the communication session is initiated, an ending location in which the communication session is terminated, or a combination thereof.

8. The one or more computer-readable media of claim 7, wherein the location information includes a cell, a sector, a city, a zip code, a state, a geographical coordinate, or a combination thereof.

9. The one or more computer-readable media of claim 6, wherein the threshold is a positive quantity that is about or greater than 20 percent of the first weighted moving average.

* * * * *